US012736818B2

(12) United States Patent
Park et al.

(10) Patent No.: US 12,736,818 B2
(45) Date of Patent: Sep. 15, 2026

(54) ELECTRONIC DEVICE AND CONTROLLING METHOD OF ELECTRONIC DEVICE

(71) Applicant: SAMSUNG ELECTRONICS CO., LTD., Suwon-si (KR)

(72) Inventors: Kyongtae Park, Suwon-si (KR); Nari Kim, Suwon-si (KR); Chanhyung Yoo, Suwon-si (KR); Hoyoung Jung, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 451 days.

(21) Appl. No.: 18/327,891

(22) Filed: Jun. 2, 2023

(65) Prior Publication Data

US 2023/0305308 A1 Sep. 28, 2023

Related U.S. Application Data

(63) Continuation of application No. PCT/KR2022/012507, filed on Aug. 22, 2022.

(30) Foreign Application Priority Data

Aug. 24, 2021 (KR) ........................ 10-2021-0111919

(51) Int. Cl.
*G02B 27/01* (2006.01)

(52) U.S. Cl.
CPC .. *G02B 27/0172* (2013.01); *G02B 2027/0112* (2013.01); *G02B 2027/0118* (2013.01); *G02B 2027/0178* (2013.01)

(58) Field of Classification Search
CPC .................................................. G02B 27/0172
See application file for complete search history.

(56) References Cited

U.S. PATENT DOCUMENTS 8,916,994 B2 12/2014 Jung et al.
9,110,291 B2 8/2015 Dominguez-Caballero et al.
(Continued)

FOREIGN PATENT DOCUMENTS

CN 112859343 A 5/2021
JP 2010-145674 A 7/2010
(Continued)

OTHER PUBLICATIONS

Jeong-Tak Oh et al., "Light output performance of red AlGaInP-based light emitting diodes with different chip geometries and structures," Optics Express, Apr. 2018, 7 pages, vol. 26, No. 9.
(Continued)

*Primary Examiner* — Edmond C Lau
(74) *Attorney, Agent, or Firm* — CANTOR COLBURN LLP

(57) ABSTRACT

An electronic device includes a power supply; a display including light-emitting diodes ("LED"s), a projection lens, and a waveguide arranged in a way such that light emitted from the LEDs is input to the waveguide through the projection lens, and light-outputting efficiency of the waveguide for a first color is higher than light-outputting efficiency of the waveguide for a second color; a memory; and a processor which determines a first driving power for a first LED which emits light of the first color and a second driving power for a second LED which emits light of the second color based on the light-outputting efficiencies of the waveguide for the first color and the second color, and controls the power supply in a way such that the first and second driving powers are supplied to the first and second LEDs, respectively.

6 Claims, 12 Drawing Sheets

(56) References Cited

U.S. PATENT DOCUMENTS

| | | | | |
|---|---|---|---|---|
| 9,952,042 | B2 | 4/2018 | Abovitz et al. | |
| 10,215,979 | B2 | 2/2019 | Irzyk | |
| 10,228,506 | B2 | 3/2019 | Chung et al. | |
| 10,381,881 | B2 | 8/2019 | Wittenberg et al. | |
| 2017/0108697 | A1 | 4/2017 | El-Ghoroury et al. | |
| 2020/0158944 | A1* | 5/2020 | Wang | G02B 27/0075 |
| 2020/0166756 | A1* | 5/2020 | DeLapp | G02B 6/0016 |
| 2020/0411953 | A1 | 12/2020 | Oh | |
| 2021/0135492 | A1 | 5/2021 | Kim et al. | |
| 2021/0218289 | A1 | 7/2021 | Kyeong | |
| 2021/0351627 | A1 | 11/2021 | Park et al. | |

FOREIGN PATENT DOCUMENTS

| | | | |
|---|---|---|---|
| KR | 10-2013-0099119 | A | 9/2013 |
| KR | 10-2015-0063031 | A | 6/2015 |
| KR | 10-2017-0073218 | A | 6/2017 |
| KR | 20170084139 | A | 7/2017 |
| KR | 10-2018-0070626 | A | 6/2018 |
| WO | 2016079505 | A1 | 5/2016 |
| WO | 2019/194520 | A1 | 10/2019 |
| WO | 2020/071842 | A1 | 4/2020 |
| WO | 2020/130162 | A1 | 6/2020 |
| WO | 2021076285 | A1 | 4/2021 |

OTHER PUBLICATIONS

International Search Report mailed Dec. 8, 2022 for PCT/KR2022/012507.

Korean Office Action for Korean Application No. 10-2021-0111919; Report Mail Date Feb. 23, 2026 (22 Pages—with English translation).

* cited by examiner

ELECTRONIC DEVICE AND CONTROLLING METHOD OF ELECTRONIC DEVICE

CROSS-REFERENCE TO RELATED APPLICATIONS

This application is a continuation of International Application No. PCT/KR2022/012507 designating the United States, filed on Aug. 22, 2022, in the Korean Intellectual Property Receiving Office and claiming priority to Korean Patent Application No. 10-2021-0111919 filed on Aug. 24, 2021, in the Korean Intellectual Property Office. The disclosures of each of these applications are incorporated by reference herein in their entireties.

BACKGROUND

1. Field

The disclosure relates to an electronic device and a method for controlling the electronic device, and more particularly, to an electronic device capable of providing content through a plurality of light-emitting diodes ("LED") and a waveguide, and a method for controlling the electronic device.

2. Description of Related Art

Technology for providing various contents to a user through a head mounted display ("HMD") has been developed recently. For example, augmented reality ("AR") glasses are devices implemented to allow a user to feel AR content by wearing the device like glasses, and researches regarding the AR glasses that are convenient when being worn and providing high resolution AR content have continued.

SUMMARY

Embodiments of the disclosure relate to AR glasses implemented in an organic LED ("OLED")-based liquid crystal on silicon ("LCoS"), having a high optical efficiency, but the glasses may have a large volume to achieve high optical efficiency, so there is a limitation in miniaturization and weight reduction.

While AR glasses based on micro LED is being developed, the micro LED-based AR glass is suitable for miniaturization and weight reduction, a high level of power consumption may occur due to the low light-emitting efficiency of micro LEDs.

For example, in the case of a red LED, external quantum efficiency ("EQE") may represent an exponentially decreasing trend as the size of the LED is reduced. In addition, in the case of AR glasses for providing content through a plurality of LEDs and waveguides, a problem of power consumption may get worse since the efficiency of the waveguide is very low, so that the LED module may be desired to emit light with high luminance.

It may be desired to reduce power consumption with miniaturization and weight reduction in the development of various electronic devices, as well as AR glasses.

The various embodiments of the disclosure provide a method for controlling an electronic device and an electronic device capable of reducing power consumption while outputting light suitable for white balance when providing content through an LED and a waveguide.

According to an embodiment, an electronic device includes a power supply; a display comprising a plurality of light-emitting diodes ("LED"s), a projection lens, and a waveguide arranged in a way such that light emitted from the plurality of LEDs is input to the waveguide through the projection lens, and light-outputting efficiency of the waveguide for a first color based on diffraction of the light input thereto is higher than light-outputting efficiency of the waveguide for a second color based on diffraction of the light input thereto; a memory; and a processor which determines a first driving power for a first LED which emits light of the first color among the plurality of LEDs and a second driving power for a second LED which emits light of the second color among the plurality of LEDs based on the light-outputting efficiency of the waveguide for the first color and the light-outputting efficiency of the waveguide for the second color, and controls the power supply in a way such that the first driving power is supplied to the first LED and the second driving power is supplied to the second LED while an image is displayed on the display.

According to an embodiment, a method of controlling an electronic device comprising a plurality of LEDs, a projection lens, and a waveguide includes receiving a request for displaying content; determining a driving power by colors of the plurality of LEDs based on light-outputting efficiency of the waveguide by colors; and driving the plurality of LEDs based on the determined driving power and displaying the content.

According to an embodiment, a display module includes a plurality of LEDs; a projection lens; and a waveguide, which are arranged in a way such that light emitted from the plurality of light-emitting diodes is input to the waveguide through the projection lens, where light-outputting efficiency of the waveguide for a first color based on diffraction of the light input thereto is higher than light-outputting efficiency of the waveguide for a second color based on the diffraction of the light input thereto.

Embodiments of the electronic device according to the disclosure may reduce power consumption of the electronic device by controlling the light-outputting efficiency for each color of the waveguide and the driving power for each color of the LED while outputting light suitable for white balance through a display including an LED and a waveguide. Accordingly, the heat generation of the electronic device may be reduced and the use time of the electronic device may be increased.

BRIEF DESCRIPTION OF THE DRAWINGS

The above and other features of certain embodiments of the disclosure will be more apparent from the following description taken in conjunction with the accompanying drawings, in which.

DETAILED DESCRIPTION

Figure 1:
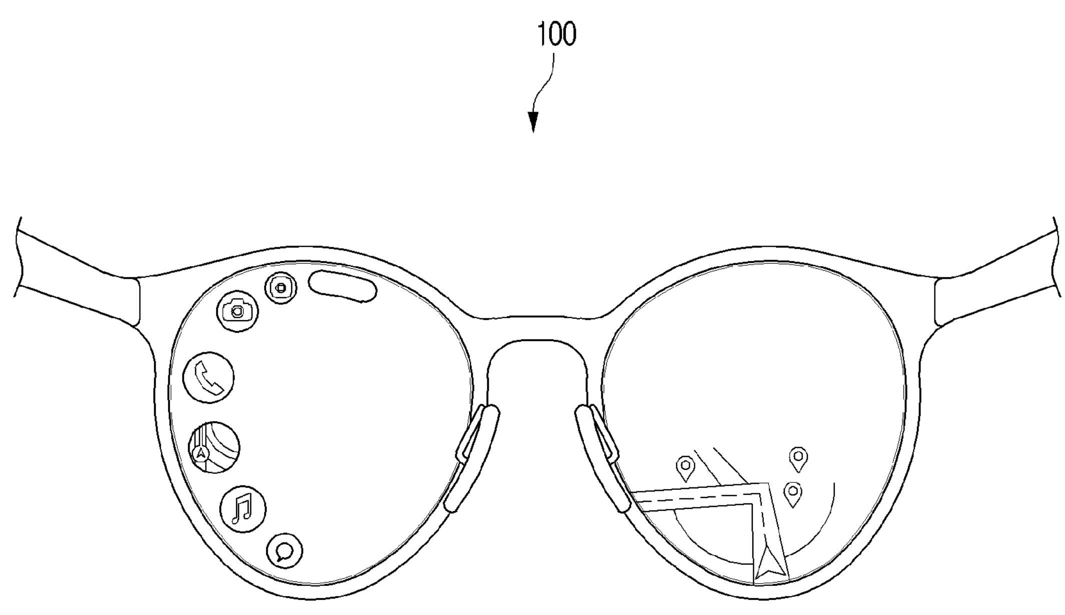
FIG. 1 illustrates an embodiment of an electronic device according to the disclosure where the electronic device is implemented as AR glasses.

The embodiments may apply various transformations and have various embodiments, and specific embodiments are illustrated in the drawings and described in detail in the detailed description. However, it is to be understood that the disclosure is not limited to specific embodiments, but includes various modifications, equivalents, and/or alternatives according to embodiments of the disclosure. Throughout the accompanying drawings, similar components will be denoted by similar reference numerals.

In describing the disclosure, if it is determined that a detailed description of a related known function or configuration may unnecessarily obscure the gist of the disclosure, a detailed description thereof will be omitted.

In addition, the following embodiments may be modified in many different forms, and the scope of the technical spirit of the disclosure is not limited to the following examples. Rather, these embodiments are provided so that this disclosure will be thorough and complete, and will fully convey the technical spirit to those skilled in the art.

The terms used herein are to describe certain embodiments and are not intended to limit the scope of claims. A singular expression includes a plural expression unless otherwise specified. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an."

The terms "have", "may have", "include", and "may include" used in the example embodiments of the disclosure indicate the presence of corresponding features (for example, elements such as numerical values, functions, operations, or parts), and do not preclude the presence of additional features.

In the description, the term "A or B", "at least one of A or/and B", or "one or more of A or/and B" may include all possible combinations of the items that are enumerated together. For example, the term "at least one of A or/and B" includes (1) including at least one A, (2) including at least one B, or (3) including both at least one A and at least one B.

In addition, expressions "first", "second", or the like, used in the disclosure may indicate various components regardless of a sequence and/or importance of the components, may be used to distinguish one component from the other components, and do not limit the corresponding components.

It will be understood that when an element is referred to as being "on" another element, it can be directly on the other element or intervening elements may be present therebetween. In contrast, when an element is referred to as being "directly on" another element, there are no intervening elements present.

When any component (for example, a first component) is (operatively or communicatively) coupled with/to or is connected to another component (for example, a second component), it is to be understood that any component may be directly coupled with/to another component or may be coupled with/to another component through the other component (for example, a third component).

On the other hand, when any component (for example, a first component) is "directly coupled with/to" or "directly connected to" to another component (for example, a second component), it is to be understood that the other component (for example, a third component) is not present between the directly coupled components.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a central processing unit ("CPU") or an application processor ("AP")) that can perform the corresponding operations by executing one or more software programs stored in a memory device.

The term "module" used in the disclosure includes units consisting of hardware, software, or firmware, and is used interchangeably with terms such as, for example, logic, logic blocks, parts, or circuits. A "module" may be an integrally constructed component or a minimum unit or part thereof that performs one or more functions. For example, the module may be configured as an application-specific integrated circuit ("ASIC").

It is understood that various elements and regions in the figures are shown out of scale. Accordingly, the scope of the disclosure is not limited by the relative sizes or spacing drawn from the accompanying drawings.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, with reference to the accompanying drawings, embodiments will be described in detail so that those skilled in the art to which the disclosure belongs to can easily make and use the embodiments.

FIG. 1 illustrates an embodiment of an electronic device 100 according to the disclosure where the electronic device 100 is implemented as AR glasses.

An embodiment of the electronic device 100 according to the disclosure refers to a device capable of displaying content through a plurality of light-emitting diodes ("LED"s). In an embodiment, for example, as shown in FIG. 1, the electronic device 100 may be implemented as an augmented reality ("AR") glasses capable of displaying AR content, but the disclosure is not limited thereto.

According to an embodiment of the disclosure, the electronic device 100 may be a head mounted display ("HMD") device, such as a device capable of providing virtual reality ("VR") content, a device capable of providing mixed reality ("MR") content, a device capable of providing extended reality ("XR") content, or a device capable of providing substitutional reality ("SR") content. A device capable of displaying content through a plurality of LEDs even with any type, structure, shape, or the like, in addition to the HMD device, may correspond to the electronic device 100 according to the disclosure.

The electronic device 100 may include a display, and may display content along with an image corresponding to a live view of reality through the display. In an embodiment, for example, the display may be a transparent display, and content may be displayed while an image corresponding to a live view of reality is displayed through a transparent display. The electronic device 100 may include a camera, and may display content together with an image acquired through the camera. Also, the electronic device 100 may display content together with an image received from an external device.

The electronic device 100 may include a plurality of LEDs, and may include, for example, a green LED, a red LED, and a blue LED. Each of the plurality of LEDs may be a micro LED having a horizontal length and a vertical length of about 100 μm or less, respectively.

With reference to FIGS. 2 to 12, various embodiments of the disclosure will be described.

Figure 2:
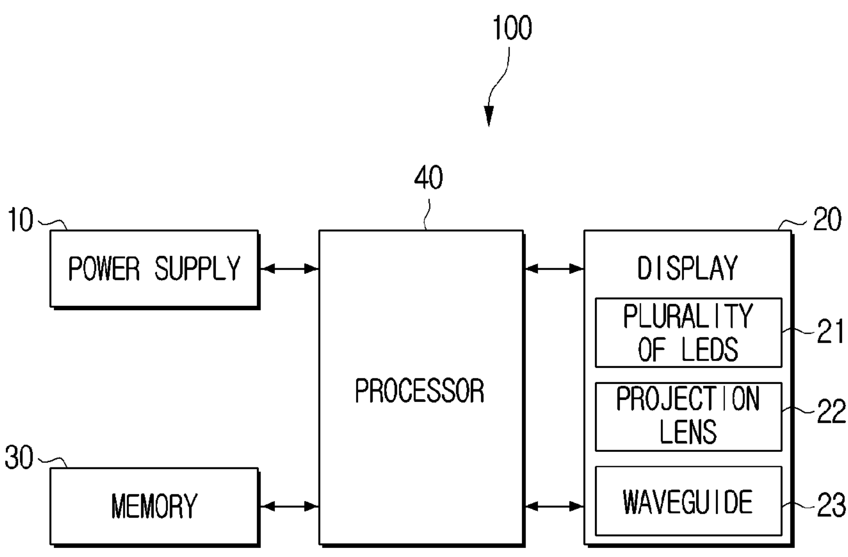
FIG. 2 schematically illustrates a configuration of an electronic device according to an embodiment of the disclosure.
Figure 3:
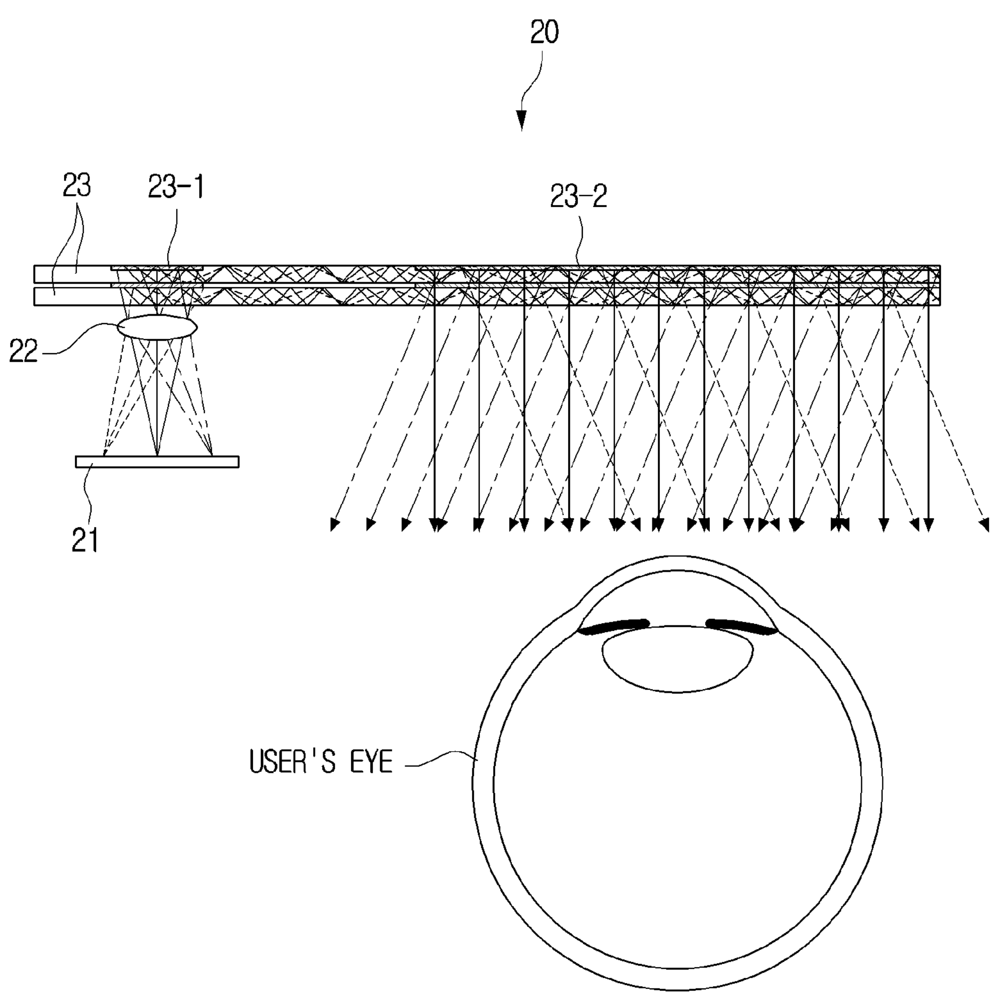
FIG. 3 illustrates in detail a configuration of a display according to an embodiment of the disclosure.
Figure 4:
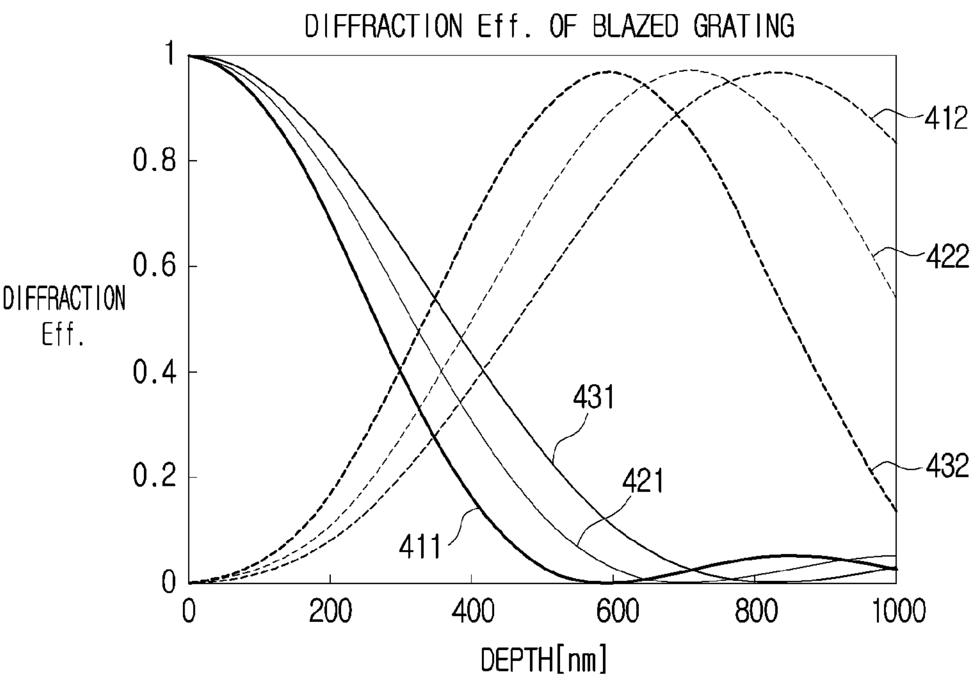
FIG. 4 is a graph illustrating diffraction efficiency according to the design of a waveguide.

FIG. 2 schematically illustrates a configuration of the electronic device 100 according to an embodiment of the disclosure; FIG. 3 illustrates in detail a configuration of the display 20 according to an embodiment of the disclosure. FIG. 4 is a graph illustrating diffraction efficiency according to the design of the waveguide 23. Hereinafter, various embodiments of the disclosure will be described with reference to FIGS. 2 to 4.

Figure 11:
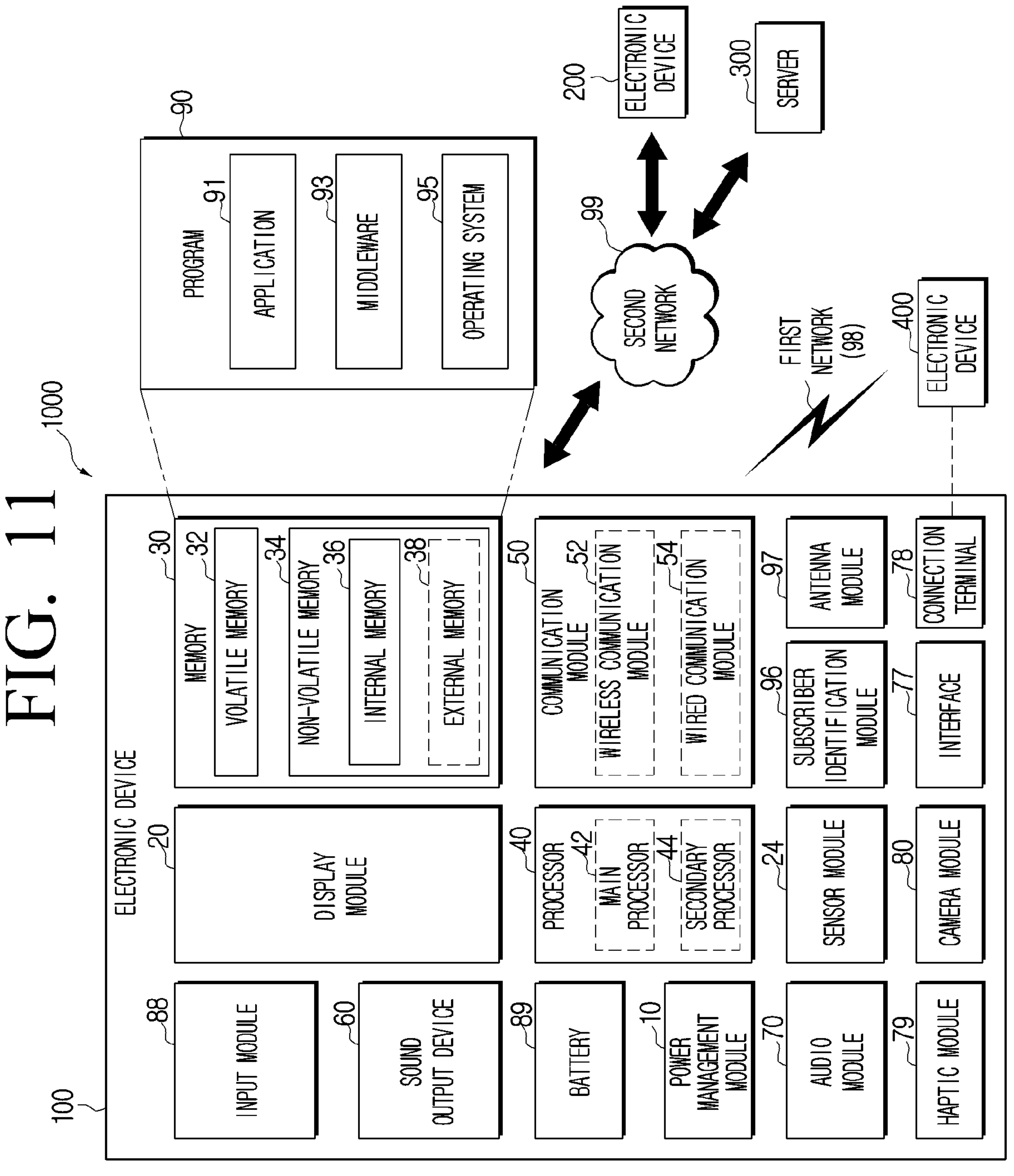
FIG. 11 is a block diagram illustrating details of an electronic device according to an embodiment of the disclosure.

As illustrated in FIG. 2, an embodiment of the electronic device 100 may include a power supply 10 (e.g., the power management module 10 of FIG. 11), a display 20 (e.g., the display module 20 of FIG. 11), a memory 30 (e.g., the memory 30 of FIG. 11) and a processor 40 (e.g., the processor 40 of FIG. 11). However, the configurations as shown in FIG. 2 are merely exemplary, and in practicing the disclosure, a new configuration may be added in addition to the configuration shown in FIG. 2 or some configuration shown in FIG. 2 may be omitted.

In an embodiment, the power supply 10 may supply power to the electronic device 100. In an embodiment, for example, the power supply 10 may enable to perform the operation of the electronic device 100 by supplying power to the configuration of the electronic device 100 including the LED module under the control of the processor 40. In embodiments of the disclosure, the power supply 10 may supply different driving power for each color of the plurality of LEDs 21 under the control of the processor 40. The driving power for each color of the plurality of LEDs 21 may be determined on the basis of the light-outputting efficiency for each color according to the design of the waveguide 23, as described below.

The display 20 may display an image or content. In an embodiment, for example, the processor 40 may display the content on the display 20 based on the image data pre-stored in the memory 30. The processor 40 may also receive image data from an external device and display the content on the display 20 based on the received data.

As shown in FIGS. 2 and 3, an embodiment of the display 20 according to the disclosure may include a plurality of LEDs 21, a projection lens 22, and the waveguide 23. In the disclosure, the display 20 may be referred to as a "display module", which is a term to refer to a unit including a plurality of LEDs 21, the projection lens 22, and the waveguide 23.

The plurality of LEDs 21 may emit light corresponding to each of the plurality of LEDs 21. In an embodiment, for example, the plurality of LEDs 21 may include a first LED for outputting light of a first color, a second LED for emitting light of a second color, and a third LED for emitting light of a third color. In an embodiment, for example, the first color may be red, the second color may be green, and the third color may be blue. In such an embodiment, the first LED may emit red light, the second LED may emit green light, and the third LED may emit blue light.

The first LED, the second LED, and the third LED may be disposed adjacent to each other to implement one pixel of the pixels of the display 20. In other words, each of the plurality of pixels constituting the display 20 may be implemented through a set of a first LED, a second LED, and a third LED, and each of the plurality of pixels constituting the display 20 may display a white color according to a combination of light emitted through each of the first LED, the second LED, and the third LED. The configuration of the plurality of LEDs 21 and the configuration of the LED module including the plurality of LEDs 21 according to various embodiments of the disclosure will be described with reference to FIGS. 5 to 10.

The projection lens 22 may receive at least a portion of the light emitted from the plurality of LEDs 21. Referring to FIG. 3, a portion of the light emitted from the plurality of LEDs 21 is received by the projection lens 22. The type of projection lens 22 according to the disclosure is not particularly limited.

The waveguide 23 may output light input through the projection lens 22. As shown in FIG. 3, the waveguide 23 may include an inputter 23-1 for receiving light through the projection lens 22 and an outputter 23-2 for outputting the input light.

In an embodiment, when at least a portion of the light emitted from the plurality of LEDs 21 is input to the inputter 23-1 of the waveguide 23 through the projection lens 22, the input light is transmitted along the interior of the waveguide 23 to the outputter 23-2 of the waveguide 23, and the outputter 23-2 of the waveguide 23 may output light at a predetermined position. The predetermined position is an area where an image is displayed on the display 20 and may represent, for example, an eye-box meaning an area in which an image projected through the outputter 23-2 may be clearly maintained on the display 20.

The light-outputting efficiency of the waveguide 23 may vary depending on the internal design of the waveguide 23. The light-outputting efficiency refers to an index indicating the efficiency of the light output by the outputter 23-2 of the waveguide 23 with respect to the light input to the inputter 23-1 of the waveguide 23, and may be used as a sense of light efficiency of the waveguide 23, such as diffraction efficiency according to the diffraction grating.

In an embodiment, the waveguide 23 may include a diffractive element, such as diffractive optical elements ("DOE") or holographic optical elements ("HOE"). The light output efficiency of the waveguide 23 may be determined based on a depth of a diffraction grating constituting the diffractive element, and may also be determined based on various factors such as a period or a refractive index of the diffraction grating. The design and manufacturing method of the waveguide 23 do not have a specific limitation.

The depth of the diffraction grating refers to the depth of the patterns formed by the diffraction grating, and specifically the height of the diffraction grating with respect to the surface of the waveguide 23. The period of the diffraction grating refers to an interval of patterns formed inside the waveguide 23, and specifically, may mean a distance between adjacent diffraction gratings among the plurality of diffraction gratings.

Referring to FIG. 4, the diffraction efficiency according to the depth of the diffraction grating included in the waveguide 23 for each of the blue, green and red light is different from each other. FIG. 4 shows diffraction efficiency for each depth of a blazed grating (or echelette grating) included in the DOE. The blazed grating refers to a diffraction grating which may exhibit high efficiency at a specific wavelength by adjusting the gradient of the diffraction grating.

FIG. 4 includes a graph 411 representing the zeroth order diffraction efficiency of blue light having a center wavelength of 460 nanometers (nm), a graph 421 representing the zeroth order diffraction efficiency of green light having a center wavelength of 550 nm, and a graph 431 representing the zeroth order diffraction efficiency of each red light having a center wavelength of 640 nm. FIG. 4 also includes a graph 432 representing the first order diffraction efficiency of blue light having a center wavelength of 460 nm, a graph 422 representing the first order diffraction efficiency of green light having a center wavelength of 550 nm, and a graph 412 representing the first order diffraction efficiency of each red light having a center wavelength of 640 nm.

The zeroth diffraction efficiency represents a ratio in which the light input to the waveguide 23 is transmitted without being diffracted by the diffractive element, and the first diffraction efficiency represents a ratio in which a progress angle is changed as the light input to the waveguide 23 is diffracted by the diffractive element.

In FIG. 4, for example, when the depth of the diffractive element is 250 nm, the difference between the zeroth diffraction efficiency and the first diffraction efficiency of the blue light is about 15%, whereas the difference between the zeroth diffraction efficiency and the first diffraction efficiency of the red light is about 60% or more. If the depth of the diffractive element is greater than 300 nm, in the case of blue light, reverse that the zeroth diffraction efficiency is greater than the first diffraction efficiency may occur, and the difference between the zeroth diffraction efficiency and the first diffraction efficiency may increase as the depth of the diffractive element increases from 300 nm. If the depth of the diffractive element is greater than 300 nm, the difference between the zeroth diffraction efficiency and the first diffraction efficiency of the red light is reduced.

Referring to FIG. 4, it is possible to increase the diffraction efficiency of light having a specific color according to the design of the waveguide 23 and relatively reduce the diffraction efficiency of light having a color different from the specific color. In an embodiment, for example, the waveguide 23 according to the disclosure may be configured in a way such that the light output efficiency for the first color based on the diffraction of the light input to the waveguide 23 is higher than the light-outputting efficiency for the second color based on the diffraction of the light input to the waveguide 23. In an embodiment, for example, where the first color is red and the second color is blue, the red light-outputting efficiency may be higher than the blue light-outputting efficiency. In an embodiment, for example, red light-outputting may be twice the light-outputting of blue.

Referring to FIG. 3, the waveguide 23 in which two plates are combined with each other is illustrated, but the number of plates constituting the waveguide 23 may be one or two depending on the size of the outputter 23-2 of the waveguide 23 (Example: eye box size), the angle of view of the image output through the waveguide 23, or the refractive index of the medium inside the waveguide 23, may consist of or defined by one or two sheets, or may be three individual plates suitable according to each wavelength of red, green, and blue. The number of waveguides 23 included in the electronic device 100 is not particularly limited.

At least one instruction regarding the electronic device 100 may be stored in the memory 30. In addition, an operating system ("O/S") for driving the electronic device 100 may be stored in the memory 30. The memory 30 may store various software programs or applications for operating the electronic device 100 according to various embodiments. The memory 30 may include a semiconductor memory such as a flash memory, a magnetic storage medium such as a hard disk, or the like.

According to an embodiment, the memory 30 may store various software modules for operating the electronic device 100, and the processor 40 may control the operation of the electronic device 100 by executing various software modules that are stored in the memory 30. That is, the memory 30 may be accessed by the processor 40, and may perform reading, recording, modifying, deleting, updating, or the like, of data by the processor 40.

It is understood that the term memory 30 may be used to refer to any volatile or non-volatile memory, a read-only memory ("ROM"), a random access memory ("RAM") proximate to or in the processor 40 or a memory card (for example, a micro secured digital ("SD") card, a memory stick) mounted to the electronic device 100.

According to various embodiments of the disclosure, the memory 30 may store various information such as image data corresponding to content, information on the light-outputting efficiency for each color of the waveguide 23, information on driving power for each color of the plurality of LEDs 21, and information on a predetermined white balance. In addition, various information required within a range for achieving the purpose of the disclosure may be stored in a memory, and the information stored in the memory may be updated as they are received from an external device or input by a user.

The processor 40 controls overall operations of the electronic device 100. Specifically, the processor 40 is connected to a configuration of the electronic device 100 including the power supply 10, the display 20, and the memory 30 functionally, and controls overall operations of the electronic device 100 by executing at least one instruction stored in the memory 30 as described above.

The processor 40 may be implemented in various ways. In an embodiment, for example, the processor 40 may be implemented as at least one of an application specific integrated circuit ("ASIC"), an embedded processor, a microprocessor, a hardware control logic, a hardware finite state machine ("FSM"), a digital signal processor ("DSP"), or the like. Further, processor 40 may include at least one selected from a CPU, a graphic processing unit ("GPU"), a main processing unit ("MPU"), or the like.

According to an embodiment, the processor 40 may determine a first driving power for a first LED which emits light of a first color among the plurality of LEDs and a second driving power for a second LED which emits light of a second color among the plurality of LEDs based on the light output efficiency of the first color and the light-outputting efficiency for the second color. The processor 40 may control the power supply 10 in a way such that the first driving power is supplied to the first LED and the second driving power is supplied to the second LED while the content is displayed on the display.

In an embodiment, for example, where the first color is red and the second color is blue and the red light-outputting efficiency is higher than the blue light-outputting efficiency, the processor 40 may control the power supply 10 to supply the first driving power to the first LED that emits red light and the second driving power to the second LED that emits blue light. In an embodiment, for example, when the first color is red and the second color is blue and the red light-outputting efficiency is twice the light-outputting efficiency for the blue light, the processor 40 may control the power supply 10 so that the first driving power is supplied to the first LED that emits red light and the second driving power that is twice the first driving power is supplied to the second LED that emits blue light.

In an embodiment, the ratio of the first driving power to the second driving power may be inversely proportional to the ratio of the light-outputting efficiency for the first color to the light-outputting efficiency for the second color. In addition, the first driving power, the second driving power, the light-outputting efficiency for the first color, and the light-outputting efficiency for the second color may be determined in way such that the white balance of the light output through the waveguide 23 corresponds to a predetermined white balance. The relationship between the light output efficiency for each color of the waveguide 23 and the driving power for each color of the plurality of LEDs 21 will be described in more detail with reference to the following embodiments.

Figure 8:
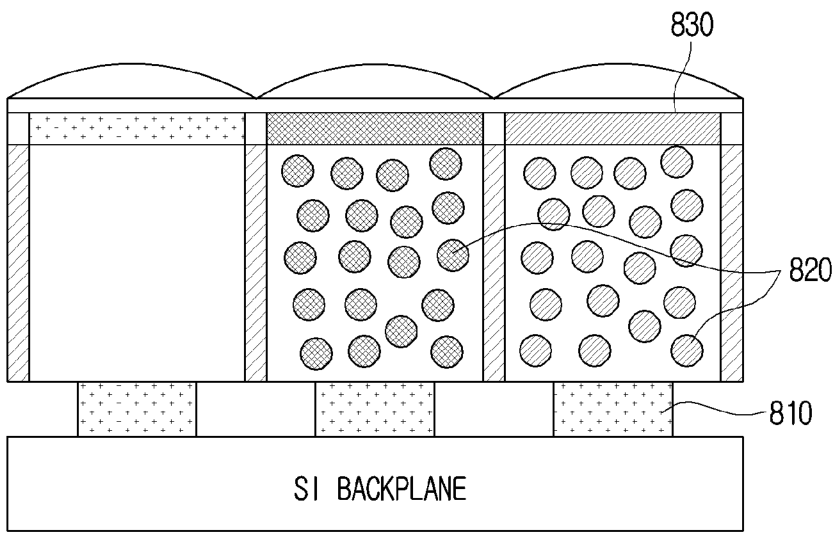
FIGS. 8 to 10 illustrate a configuration of an LED module according to various embodiments of the disclosure.

In an embodiment, for example, the ratio of the light-outputting efficiency for blue, green, and red of the waveguide 23 may be 0.5:1:2, and the luminance ratio of the blue, green, and red light to generate the light of the predetermined white balance may be 1:6:3. The luminance ratio of 1:6:3 is a value calculated by assuming that the down conversion efficiency of the color conversion medium is commonly around 20% on red and green colors when the plurality of LED modules 21 according to the disclosure are implemented as an LED module as shown in FIG. 8, but the disclosure is not limited thereto. In an embodiment, for example, the luminance ratio of blue, green, and red light for the digital cinema initiatives ("DCI")-P3 may vary from 0.8:6.9:2.3 depending on the conditions of the center wavelength.

In an embodiment, assuming that the total driving power of the blue LED, the green LED, and the red LED for generating light of a luminance ratio of 1:6:3 is 100, the driving power of the blue LED, the green LED, and the red LED may be 15, 35, and 50, respectively. The power consumption of the red LED for generating the white light according to the low light-emitting efficiency of the red LED may be the largest, and the power consumption of the blue LED may be the smallest.

In an embodiment, the driving power of the blue LED, the green LED, and the red LED may be adjusted to 30, 35, and 25, respectively. In such an embodiment, the ratio of the light-outputting efficiency for the blue, green, and red LEDs of the waveguide 23 may be 0.5:1:2 as described above, and the driving power of the blue LED, the green LED, and the red LED may be determined to be inversely proportional to the ratio of the light-outputting efficiency for the blue, green, and red LEDs of the waveguide 23. In such an embodiment, the total power consumption of the display 20 is equal to 90 (e.g., the sum of the driving power of the blue LED, the green LED, and the red LED), so that power consumption may be reduced compared to 100 which is the total driving power in a case where the driving power of the blue LED, the green LED, and the red LED is 15, 35, and 50, respectively.

In an embodiment of the electronic device, a ratio of the first driving power to the second driving power is inversely proportional to a ratio of light-outputting efficiency for the first color to light-outputting efficiency for the second color, but this is merely exemplary, and as described above, the light-outputting efficiency for the second color may be determined in a way such that white balance of the light output through the waveguide 23 corresponds to a predetermined white balance. The purpose of the disclosure is to reduce power consumption while outputting light suitable for white balance. Here, the predetermined white balance may be changed according to a developer or setting of a user as a value set to view content having a white balance suitable for a user.

The white balance of the light output through the waveguide 23 may be calculated through a region including a center of the outputter 23-2 and has an area of about 15% or less relative to a total area of the outputter 23-2. This is to increase the reliability of evaluation of white balance of light output through the waveguide 23, and the area of about 15% may vary depending on embodiments.

According to an embodiment described above with reference to FIGS. 2 to 4, the electronic device 100 may reduce the power consumption of the electronic device 100 by controlling the light-outputting efficiency for each color of the waveguide 23 and the driving power for each color of the LED while outputting light suitable for white balance through the display 20 including the LED and the waveguide 23. Accordingly, the heat generation of the electronic device 100 may be reduced, and the use time of the electronic device 100 may be increased.

Figure 5:
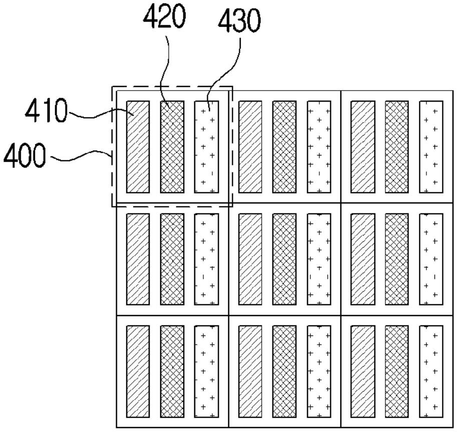
FIGS. 5 to 7 illustrate a pixel configuration of a display according to various embodiments of the disclosure.
Figure 6:
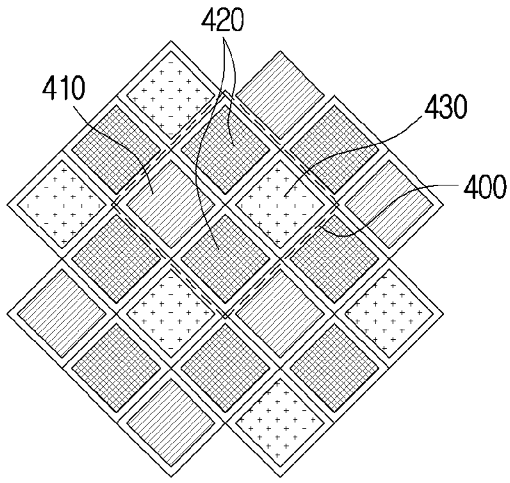
Figure 7:
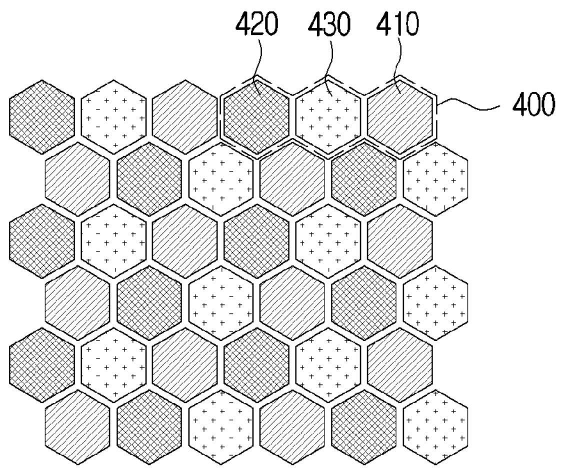

FIGS. 5 to 7 illustrate a pixel configuration of the display 20 according to various embodiments of the disclosure. Specifically, FIGS. 5-7 illustrate some of the pixels of the display 20 according to various embodiments of the disclosure, respectively.

Referring to FIGS. 5 to 7, in an embodiment of the disclosure, the red LED 410, the green LED 420, and the blue LED 430 may be disposed adjacent to each other to implement one 400 of the pixels of the display 20. However, the arrangement of the LEDs shown in FIGS. 5 to 7 is merely exemplary, and the disclosure may be applied even if it is arranged in any manner.

In an embodiment, LEDs that emit green, red, and blue light, as well as parts of an LED module implemented to emit red, green, and blue light through a color conversion medium, may be referred to as the first LED, the second LED, and the third LED, that is, the red LED 410, the green LED 420, and the blue LED 430. The configuration of an LED module configured to emit green, red, and blue light through a color conversion medium will be described with reference to FIG. 8.

Figure 9:
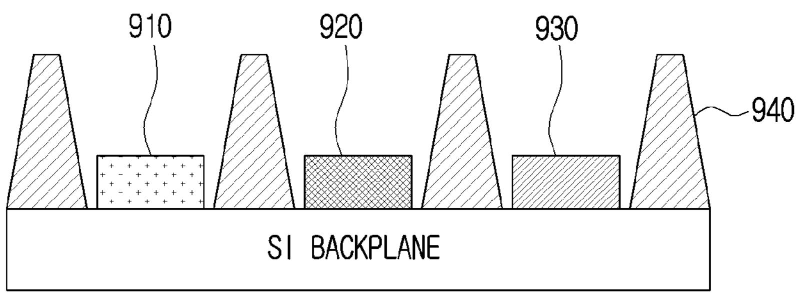
Figure 10:
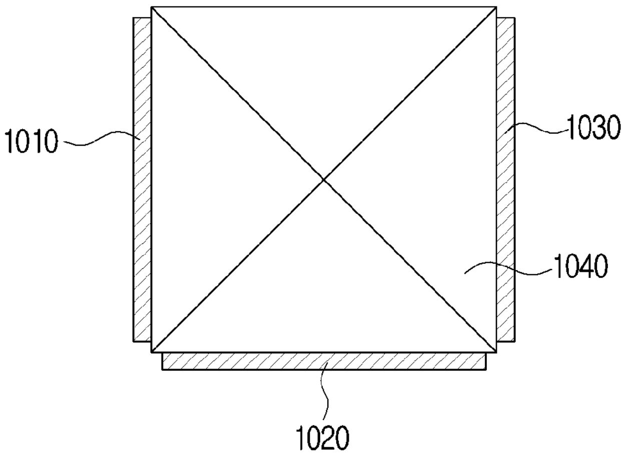

FIGS. 8 to 10 are views for illustrating a configuration of an LED module according to various embodiments of the disclosure. Specifically, FIGS. 8-10 illustrate a configuration of an embodiment of an LED module for implementing one pixel of the display 20. Herein, the term LED module may include a plurality of LED 21 and configurations related to the emission of the LEDs 21.

Referring to FIG. 8, an embodiment of the LED module according to the disclosure may include a silicon (Si) based backplane and three blue LEDs 810 disposed on the backplane. In an embodiment, for example, in that the blue LED light 810 has a wavelength suitable for use as excitation light of a color conversion medium, such as quantum dots, the blue LED light 810 may be used as the excitation light of the LED module.

As shown in FIG. 8, in an embodiment, a color conversion layer for converting the color of light emitted through the blue LED module 810 into green color and a color conversion layer for converting the color emitted through the blue LED 810 into red color may be included on two blue LEDs 810 among the three blue LEDs 810. The color conversion layer may include a color conversion medium 820 as shown in FIG. 8, and the color conversion medium 820 may be implemented as a quantum dot, for example. A color filter 830 and a protection layer may be additionally disposed on the color conversion layer.

Referring to FIG. 9, in an alternative embodiment, the LED module may include a red LED 910, a green LED 920, and a blue LED 930, and may include a barrier reflector 940 for preventing the leakage of light emitted through each of the red LED 910, the green LED 920, and the blue LED 930. An embodiment of the LED module according to the disclosure may be configured to implement a pixel of the display 20 in a so-called native LED scheme.

In an embodiment, as shown in FIGS. 8 and 9, the red LED, green LED and blue LED are disposed adjacent to each other to configure one pixel. Alternatively, referring to FIG. 10, in an embodiment, the LED module may be configured in a way such that a first panel 1010 including a plurality of red LEDs, a second panel 1020 including a plurality of green LEDs and a third panel 1030 including a plurality of blue LEDs are included, and a prism 1040 (e.g., X-cube prism) is provided to collect the light emitted from each of the first panel 1010, the second panel 1020, and the third panel 1030.

Although the various embodiments of the LED module are described with reference to FIGS. 8 through 10, embodiments of the LED module according to the disclosure may be variously modified without departing from the teachings herein.

As shown in FIGS. 8 to 10, various embodiments according to the disclosure may be applied. In the case of FIG. 8 to FIG. 10, a problem to generate a high-level power consumption and heat generation may occur due to the low light-emitting efficiency of the red LED light, and it is possible to reduce power consumption and heat generation while outputting light suitable for white balance according to the disclosure. In particular, as in the case of FIG. 9, when a pixel of the display 20 is implemented in a native LED manner, a higher level of power consumption results in a reduction effect of power consumption according to the disclosure.

FIG. 11 is a block diagram illustrating details of an electronic device according to an embodiment of the disclosure.

FIG. 11 is a block diagram of the electronic device 100 in the network environment 1000 according to various embodiments. FIG. 11 is a block diagram of an electronic device 100 in a network environment 1000 according to various embodiments. Referring to FIG. 11, in the network environment 1000, the electronic device 100 may communicate with an electronic device 400 via a first network 98 (e.g., a short-range wireless communication network) or communicate with an electronic device 200 or a server 300 via a second network 99 (e.g., wide area network). According to an embodiment, the electronic device 100 may communicate with the electronic device 200 via the server 300.

According to an embodiment, the electronic device 100 may communicate with the first server 200 through the second server 300. According to an embodiment, the electronic device 100 may include a processor 40, a memory 30, an input module (or an input device) 88, an audio output module (or a sound output device) 60, a display module 20, an audio module 70, a sensor module 24, an interface 77, a connection terminal 78, a haptic module 79, a camera module 80, a power management module 10, a battery 89, a communication module 50, a subscriber identification module 96, or an antenna module 97. In some embodiments, at least one (e.g., the connection terminal 78) selected from these components may be omitted from electronic device 100, or one or more other components may be added. In some embodiments, some of these components (e.g., the sensor module 24, the camera module 80, or the antenna module 97) may be integrated into or included in another element (e.g., the display module 20).

The power management module 10 may manage power supplied to the electronic device 100. According to an embodiment, the power management module 10 may be implemented as, for example, at least a part of power management integrated circuit ("PMIC"). In the disclosure, the power management module 10 may be referred to as the term "power unit."

The display module 20 may visually provide information to an outside (e.g., user) of the electronic device 100. The display module 20 may include, for example, a display, a hologram device, a projector, or a control circuit for controlling the device. According to an embodiment, the display module 20 may include a touch sensor which is set to detect a touch or a pressure sensor which is set to measure intensity of power generated by the touch. A user interface (UI) provided through the display module 20 will be described in greater detail with reference to FIGS. 5 to 7.

The sensor module 24 may detect the operation state of the electronic device 100 (e.g., power or temperature), or an external environment state (e.g., a user state), and generate an electrical signal or a data value corresponding to the detected state. According to an embodiment, the sensor module 24 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The memory 30 may store various data used by at least one component (e.g., processor 40 or sensor module 24) of the electronic device 100. The data may include, for example, software (e.g., program 90) and input data or output data related with software instructions. The memory 30 may include the volatile memory 32 or non-volatile memory 34.

The processor 40, for example, may execute software (e.g., program 90) to control at least one other component (e.g., hardware or software component) of the electronic device 100 coupled to the processor 40, and may perform various data processing or operations.

According to an embodiment, as at least a part of the data processing or operation, the processor 40 may store the command or data received from another component (e.g., the sensor module 24 or the communication module 50) to a volatile memory 32, process command or data stored in the volatile memory 32, and store the result data in a non-volatile memory 34. The processor 40 may include a main processor 42 (e.g., a central processing unit ("CPU") or an AP), or a secondary processor 44 (e.g., a graphics processing unit ("GPU"), a neural processing unit ("NPU"), an image signal processor ("ISP"), a sensor hub processor, or a communication processor ("CP")) which may be operated together or independently. In an embodiment, for example, where the electronic device 100 includes the main processor 42 and the secondary processor 44, the secondary processor 44 may be configured to use lower power than the main processor 42, or to be specialized for a specified function. The secondary processor 44 may be implemented separately from, or as a part of, the main processor 42.

The secondary processor 44 may, for example, in place of the main processor 42 while the main processor 42 is in a deactivated state (e.g., a sleep state) or along with the main processor 42 while the main processor 42 is in an active state (for example: execution of an application) control a part of the functions or states related to at least one component (e.g., the display module 20, the sensor module 24, or the communication module 50) among the components of the electronic device 100. The secondary processor 44 (e.g., an ISP or a CP) may be implemented as a part of a functionally related other components (e.g., the camera module 80 or the communication module 50).

The secondary processor 44 (e.g., a neural network processing device) may include a hardware structure specialized for processing an artificial intelligence ("AI") model. The AI model may be generated through machine learning. Such learning may be performed, for example, by the electronic device 100 in which an AI model is performed, or may be performed through a separate server. The learning algorithms may include, but are not limited to, supervised learning, unsupervised learning, semi-supervised learning, or reinforcement learning. The AI model may include a plurality of artificial neural network layers. The artificial neural network may be, but is not limited to, a deep neural network ("DNN"), a convolutional neural network ("CNN"), a recurrent neural network ("RNN"), a restricted Boltzmann machine, a deep belief network ("DBN"), a bi-directional recurrent DNN ("BRDNN"), deep Q-networks, or a combination of two or more thereof. The AI model may additionally or alternatively include a software structure, in addition to the hardware structure.

The communication module 50 may support establishment of direct (e.g., a wired) communication channel between the electronic device 100 and an external electronic device (e.g., electronic device 200, server 300, or electronic device 400) or wireless communication channel, and communication through the established communication channels. The communication module 50 may include one or more CPs which are operated independently of the processor 40 (e.g., an AP) and support direct (e.g., wired) communication or wireless communication.

According to an embodiment, the communication module 50 may include a wireless communication module 52 (e.g., cellular communication module, near field wireless communication module, or global navigation satellite system ("GNSS") communication module) or a wired communication module 54 (e.g., a local area network ("LAN") communication module, or a power line communication module). The corresponding communication module among these communication modules may communicate with an external electronic device 200 through the first network 98 (e.g., Bluetooth™, WiFi direct or near field communication ("NFC") network such as IR data association ("IrDA")) or the second network 99 (e.g., a telecommunication network such as a legacy cellular network, a 5G network, a next generation communication network, the Internet, or a computer network (e.g., a LAN or a WAN)). These types of communication modules may be incorporated into one component (e.g., a single chip) or implemented with a plurality of components (e.g., a plurality of chips) that are separate from each other. The wireless communication module 12 may confirm or authenticate the electronic device 100 in the communication network such as the first network 98 or the second network 99 using the subscriber information (e.g., international mobile subscriber identity ("IMSI")) stored in the subscriber identification module 96.

The wireless communication module 52 may support a 5G network and a next generation communication technology, e.g., new radio ("NR") access technology after a 4G network. The NR connection technology may support high-capacity data high-speed transmission (enhanced mobile broadband ("eMBB")), terminal power minimization, massive machine type communications ("mMTC"), or ultra-reliable and low-latency communications ("URLLC"). The wireless communication module 12 may support a high frequency band (e.g., an mmWave band), for example, to achieve a high data transmission rate. The wireless communication module 52 may support technologies such as various technologies for securing performance in a high frequency band, e.g., beamforming, massive multiple-input and multiple-output ("MIMO"), full dimensional MIMO ("FD-MIMO"), array antenna, analog beam-forming, or large scale antenna. The wireless communication module 12 may support various requirements defined in the electronic device 100, the external electronic device (e.g., the electronic device 200) or the network system (e.g., the second network 99). The wireless communication module 12 may support a peak data rate (e.g., at least 20 Gbps) for realizing an eMBB, a loss coverage (e.g., 164 dB or less) for mMTC implementation, or a U-plane latency (e.g., downlink ("DL") and uplink ("UL") by 0.5 ms or below, respectively, or round trip 1 ms or below) for URLLC implementation.

The sound output module 60 may output an acoustic signal to the outside of the electronic device 100. The sound output module 60 may include, for example, a speaker or receiver. The speaker may be used for general purposes, such as multimedia reproduction or recording/reproduction. The receiver may be used to receive an incoming call. According to one embodiment, the receiver may be implemented separately from or as part of a speaker.

The audio module 70 may convert sound into an electric signal, or convert an electric signal to sound. According to an embodiment, the audio module 70 may acquire sound through an input module 76, or output sound through the sound output module 60, or an external electronic device (e.g., electronic device 400) (e.g., speaker or headphone) which is directly or wirelessly connected to the electronic device 100.

The interface 77 may support one or more designated protocols that may be used by the electronic device 100 to be connected directly or wirelessly to an external electronic device (e.g., electronic device 400). According to an embodiment, the interface 77 may include, for example, a high definition multimedia interface ("HDMI)", a universal serial bus ("USB") interface, an SD card interface, or an audio interface.

The connection terminal 78 may include a connector through which the electronic device 100 may be physically connected to an external electronic device (e.g., the electronic device 400). According to an embodiment, the connection terminal 78 may include, for example, an HDMI connector, a USB connector, an SD card connector, or an audio connector (e.g., a headphone connector).

The haptic module 79 may convert an electrical signal into a mechanical stimulus (e.g., vibration or motion) or an electrical stimulus that a user may recognize through a tactile or kinesthetic sense. According to an embodiment, the haptic module 79 may include, for example, a motor, a piezoelectric element, or an electric stimulation device.

A camera module 80 may photograph a still image or a moving image. According to an embodiment, the camera module 80 may include one or more lenses, image sensors, ISPs, or flashes.

The input module 88 may receive a command or data to be used for the components (e.g., processor 40) of the electronic device 100 from the outside (e.g., user) of the electronic device 100. The input module 88 may include, for example, a microphone, a mouse, a keyboard, a key (e.g., button), or a digital pen (e.g., a stylus pen).

The battery 89 may supply power to at least one component of the electronic device 100. According to an embodiment, the battery 89 may include, for example, a non-rechargeable primary battery, a rechargeable secondary battery, or a fuel cell.

The antenna module 97 may transmit a signal or power to an external device (e.g., an external electronic device) or receive a signal or power from the outside. According to an embodiment, the antenna module 97 may include an antenna comprising a conductor including or made of a conductor or conductive pattern formed over a substrate (e.g., a printed circuit board ("PCB")). According to an embodiment, the antenna module 97 may include a plurality of antennas (e.g., an array antenna). At least one antenna suitable for a communication method used in a communication network, such as the first network 98 or the second network 99, may be selected by the communication module 50 from the plurality of antennas. The signal or power may be transmitted or received between the communication module 50 and an external electronic device through at least one antenna. According to some embodiments, other components (e.g., an RFIC) other than the radiator may be further formed as part of the antenna module 97.

According to an embodiment, the antenna module 97 may form an mmWave antenna module. The mmWave antenna module may include a PCB, a radio frequency integrated circuit ("RFIC") disposed on or adjacent to a first surface (e.g., a bottom surface) of the PCB, and capable of supporting a designated high frequency band (e.g., an mmWave band), and a plurality of antennas (e.g., an array antenna) disposed adjacent to or adjacent to a second surface (e.g., top surface or side) of the PCB and capable of transmitting or receiving a signal of the designated high frequency band.

The program 90 may be stored as software in the memory 30, and may include, for example, an application 91, middleware 93, or an operating system 95. In the disclosure, the term "program" may be replaced with the term "software".

At least a part of the components may be interconnected through the communication method (e.g., bus, general purpose input and output ("GPIO"), serial peripheral interface ("SPI"), or mobile industry processor interface ("MIPI")) among peripheral devices and exchange a signal (e.g., command or data) from each other.

According to an embodiment, the command or data may be transmitted or received between the electronic device 100 and the external electronic device 200 via the server 300 connected to the second network 99. Each of the external electronic devices 200 or 400 may be devices which are the same or different types from the electronic device 100. According to an embodiment, whole or a part of the operations executed by the electronic device 100 may be executed by one or more external electronic devices among the external electronic devices 200, 300, or 400. In an embodiment, for example, when the electronic device 100 is instructed to perform a function or service automatically, or in response to a request from a user or another device, the electronic device 100 may request one or more external electronic devices to perform at least a part of the function or the service instead of, or in addition to, performing the function or service by itself. The one or more external electronic devices that have received the request may execute at least a portion of the requested function or service, or an additional function or service associated with the request, and transmit the result of the execution to the electronic device 100. The electronic device 100 may process the result as is or additionally, and provide the result as at least a portion of the response to the request.

In an embodiment, for example, cloud computing, distributed computing, mobile edge computing ("MEC") or client-server computing technology may be used for a communication between the electronic device 100 and the external electronic device 200 via the server 300 connected to the second network 99. The electronic device 100 may provide ultra-low latency services using distributed computing or MEC. In an alternative embodiment, the first server 200 may include an Internet of things ("IoT") device. The second server 300 may be an intelligent server using machine learning and/or neural networks. According to an embodiment, the external first server 200 or the second server 300 may be included in a second network 99. The electronic device 100 may be applied to an intelligent service (e.g., a smart home, a smart city, a smart car, or health care) on the basis of 5G communication technology and IoT-related technology.

Figure 12:
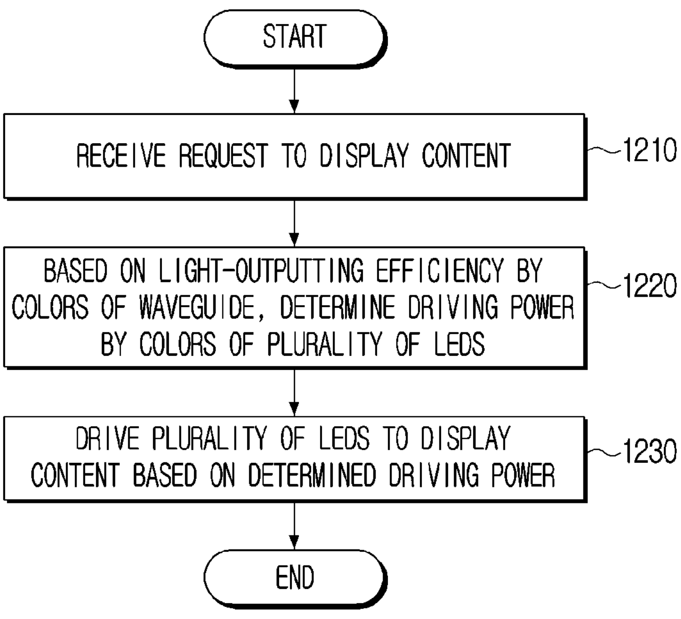
FIG. 12 is a flowchart illustrating a method of controlling an electronic device according to an embodiment of the disclosure.

FIG. 12 is a flowchart illustrating a method of controlling the electronic device 100 according to an embodiment of the disclosure.

As described above, an embodiment of the electronic device 100 according to the disclosure may include a display including a plurality of LED modules, a projection lens, and a waveguide. Since the configuration of the electronic device 100 in an embodiment of a method of controlling the electronic device 100 is substantially the same as that described above with reference to FIGS. 2 and 3, any repetitive detailed description of the same or like elements thereof will be omitted.

Referring to FIG. 12, in an embodiment, the electronic device 100 may receive 1210 a request to indicate content (1210). Here, the request for displaying the content may be received in response to an event generated inside or outside the electronic device 100, but may be received in response to a user command input through the electronic device 100 or the external device.

When a request for displaying the content is received, the electronic device 100 may determine the driving power for each color of the plurality of LEDs based on the light-outputting efficiency for each color of the waveguide (1220). Here, "determining" driving power for each color of the plurality of LEDs based on the light-outputting efficiency for each color of the waveguide may include the meaning of "identifying" the driving power for each color of the plurality of LEDs based on the data in which the driving power for each color of the plurality of LEDs corresponding to the light-outputting efficiency for each color is defined.

Based on driving power by colors of the plurality of LEDs being determined, the electronic device 100 may display content by driving a plurality of LEDs based on the determined driving power (1230).

In an embodiment, the electronic device 100 may display content by supplying a first driving power to a first LED emitting light of a first color among a plurality of LEDs and supplying a second driving power to a second LED emitting light of a second color among the plurality of LEDs.

According to an embodiment, the waveguide is configured in a way such that, based on light emitted from the plurality of LEDs being input to the waveguide through the projection lens, light-outputting efficiency of the waveguide for the first color based on diffraction of the light input to the waveguide is higher than light-outputting efficiency of the waveguide for the second color based on diffraction of the light input to the waveguide.

According to an embodiment, the first driving power and the second driving power may be determined based on the light-outputting efficiency for the first color and the light-outputting efficiency for the second color. In an embodiment, for example, when the light-emitting efficiency for the first color is higher than the light-outputting efficiency for the second color, the first driving power may be lower than the second driving power, and the first driving power may be higher than the second driving power when the light-outputting efficiency for the first color is lower than the light-outputting efficiency for the second color.

According to an embodiment, a ratio of the first driving power to the second driving power may be inversely proportional to a ratio of light-outputting efficiency for the first color to light-outputting efficiency for the second color.

According to an embodiment, the light-outputting efficiency for the second color may be determined in a way such that white balance of the light output through the waveguide corresponds to a predetermined white balance.

According to an embodiment, the waveguide may include the inputter 23-1 which receives light through the projection lens and the outputter 23-2 which outputs the input light, and the white balance of the light output through the waveguide may be calculated through a region including a center of the outputter 23-2 and has an area of about 15% or less relative to a total area of the outputter 23-2.

According to an embodiment, the light-outputting efficiency for the first color and the light-outputting efficiency for the second color may be determined based on a depth of a diffraction grating included in the waveguide.

According to an embodiment, the waveguide may include DOEs or HOEs.

In an embodiment, as described herein, the control method of the electronic device 100 may be implemented as a program and provided to the electronic device 100. A program that includes a control method of the electronic device 100 may be stored in a non-transitory computer readable medium or a non-transitory machine readable storage device.

According to an embodiment, in a non-transitory computer-readable recording medium or a non-transitory computer-readable storage device including a program for executing a control method of the electronic device 100, the control method of the electronic device 100 includes an operation of receiving a request for displaying the content, an operation of determining driving power for each color of the plurality of LEDs based on the light output efficiency for each color of the waveguide, and an operation of driving the plurality of LEDs based on the determined driving power to display the content.

Embodiments of the control method of the electronic device 100 and the computer-readable recording medium or non-transitory readable storage device including a program for executing the control method of the electronic device 100 are briefly described herein, but this is to avoid redundant description. Various embodiments of the electronic device 100 are applicable to a control method of the electronic device 100, a computer-readable recording medium including a program for executing the control method of the electronic device 100, or a non-transitory readable storage device.

The various embodiments of the disclosure may be implemented with software (e.g., program 90) including one or more instructions stored in the storage medium (e.g., internal memory 36 or external memory 38) readable by a machine (e.g., electronic device 100). In an embodiment, for example, the processor (e.g., processor 40) of a device (e.g., electronic device 100) may call at least one instruction among one or more instructions stored in the storage medium and execute the instructions. This enables a device to be operated to perform at least one function in response to the called at least one instructions. The instructions may include a code generated by a compiler or a code executable by an interpreter. The storage medium readable by a machine may be provided in the form of a non-transitory storage medium that is a tangible device and may not include a signal (e.g., electromagnetic wave). This term does not distinguish that data is permanently or temporarily stored in the storage medium.

The various embodiments of the method described herein may be provided in a computer program product. A computer program product may be exchanged between a seller and a purchaser as a commodity. A computer program product may be distributed in the form of a machine-readable storage medium (e.g., compact disc read only memory ("CD-ROM")) or distributed online through an application store (e.g. PlayStore™) directly between two user devices (e.g., smartphones). In the case of on-line distribution, at least a portion of the computer program product (e.g. downloadable app) may be stored temporarily or at least temporarily in a storage medium such as a manufacturer's server, a server of an application store, or a memory of a relay server.

Each of the components (e.g., modules or programs) according to the various embodiments described above may defined by or be composed of a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration.

Operations performed by a module, a program, or other component, according to various embodiments, may be sequential, parallel, or both, executed iteratively or heuristically, or at least some operations may be performed in a different order, omitted, or other operations may be added.

The term "module", "unit" as used in various embodiments of the disclosure, may include a unit implemented in hardware, software, or firmware, and may be used interchangeably with terms such as, for example, logic, logic blocks, components, or circuitry. The unit or module may be a minimum unit of the component, or a portion thereof, that performs one or more functions. In an embodiment, for example, a module may be implemented in the form of an application-specific integrated circuit ("ASIC").

The various embodiments described above may be implemented as software including instructions stored in a machine-readable storage media which is readable by a machine (e.g., a computer). The device may include the electronic device (e.g., electronic device 100) according to the disclosed embodiments, as a device which calls the stored instructions from the storage media and which is operable according to the called instructions.

When the instructions are executed by a processor, the processor may directory perform functions corresponding to the instructions using other components or the functions may be performed under a control of the processor. The instructions may include code generated or executed by a compiler or an interpreter.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An electronic device comprising:

a power supply;

a display comprising a plurality of light-emitting diodes, a projection lens, and a waveguide, which are arranged in a way such that light emitted from the plurality of light-emitting diodes is input to the waveguide through the projection lens, wherein light-outputting efficiency of the waveguide for a first color based on diffraction of the light input thereto is higher than light-outputting efficiency of the waveguide for a second color based on the diffraction of the light input thereto;

a memory; and a processor which determines a first driving power for a first light-emitting diode which emits light of the first color among the plurality of light-emitting diodes and a second driving power for a second light-emitting diode which emits light of the second color among the plurality of light-emitting diodes based on the light-outputting efficiency of the waveguide for the first color and the light-outputting efficiency of the waveguide for the second color, and controls the power supply in a way such that the first driving power is supplied to the first light-emitting diode and the second driving power is supplied to the second light-emitting diode while an image is displayed on the display, wherein a ratio of the first driving power to the second driving power is inversely proportional to a ratio of the light-outputting efficiency of the waveguide for the first color to the light-outputting efficiency of the waveguide for the second color.

2. The electronic device of claim 1, wherein the light-outputting efficiency of the waveguide for the first color and the light-outputting efficiency of the waveguide for the second color are determined in a way such that white balance of the light output through the waveguide corresponds to a predetermined white balance.

3. The electronic device of claim 2, wherein the waveguide comprises an inputter which receives light through the projection lens and an outputter which outputs the light input thereto, wherein the white balance of the light output through the waveguide is calculated through a region including a center of the outputter, and the region has an area of about 15% or less relative to a total area of the outputter.

4. The electronic device of claim 1, wherein the light-outputting efficiency of the waveguide for the first color and the light-outputting efficiency of the waveguide for the second color are determined based on a depth of a diffraction grating included in the waveguide.

5. The electronic device of claim 4, wherein the waveguide comprises diffractive optical elements or holographic optical elements.

6. The electronic device of claim 1, wherein the first color is a red color, and the second color is a blue color.

* * * * *